(12) United States Patent
Holmes

(10) Patent No.: US 7,872,385 B2
(45) Date of Patent: Jan. 18, 2011

(54) ELECTRIC MOTOR POWER CONNECTION ASSEMBLY

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 243 days.

(21) Appl. No.: 11/829,260

(22) Filed: Jul. 27, 2007

(65) Prior Publication Data

US 2009/0025952 A1 Jan. 29, 2009

(51) Int. Cl.
*H02K 11/00* (2006.01)
(52) U.S. Cl. .......................................... 310/71; 310/64
(58) Field of Classification Search .................... 310/71, 310/52, 58, 64
See application file for complete search history.

(56) References Cited

U.S. PATENT DOCUMENTS 6,369,474 B1 * 4/2002 Tanaka et al. .................. 310/71
6,744,161 B2 * 6/2004 Murata et al. .................. 310/71
2004/0061390 A1 * 4/2004 Baker-Bachman et al. .... 310/71

FOREIGN PATENT DOCUMENTS

| CN | 1719698 A | 1/2006 |
| EP | 1624548 A2 | 8/2006 |
| WO | 2007028039 A2 | 3/2007 |

* cited by examiner

*Primary Examiner*—Nguyen N Hanh
(74) *Attorney, Agent, or Firm*—Quinn Law Group, PLLC

(57) ABSTRACT

An electric motor power connection assembly diverts heat from an electrical conductor that carries electrical current between a power source and an electric motor. The electrical conductor is characterized by an effective cross-sectional area perpendicular to the direction of current flow and a length in the direction of current flow that is greater than the radius of a circle having the effective cross-sectional area. The "effective cross-sectional area" is the area perpendicular to the direction of current flow over which current is carried and thus depends on the cross-sectional shape and number of conductive components of the electrical conductor, which could be one or more wires. A heat diverting mechanism is positioned in thermal contact along the length of the electrical conductor to divert heat from the electrical conductor. The electric motor power connection assembly is suitable for use in a hybrid electro-mechanical transmission.

16 Claims, 3 Drawing Sheets

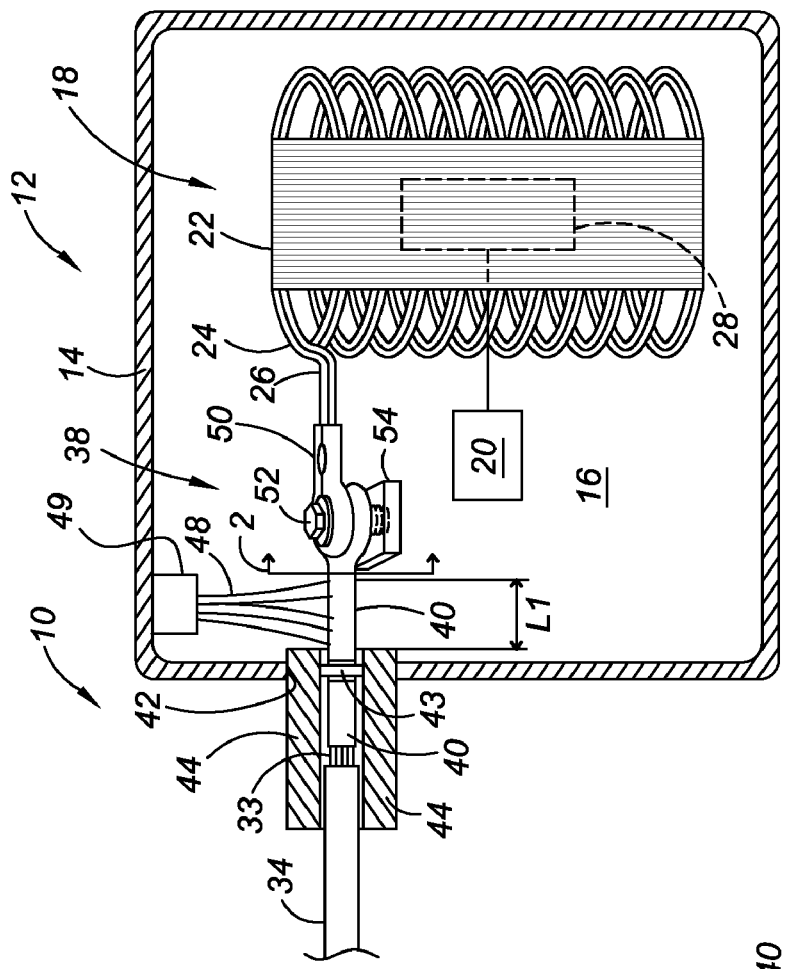
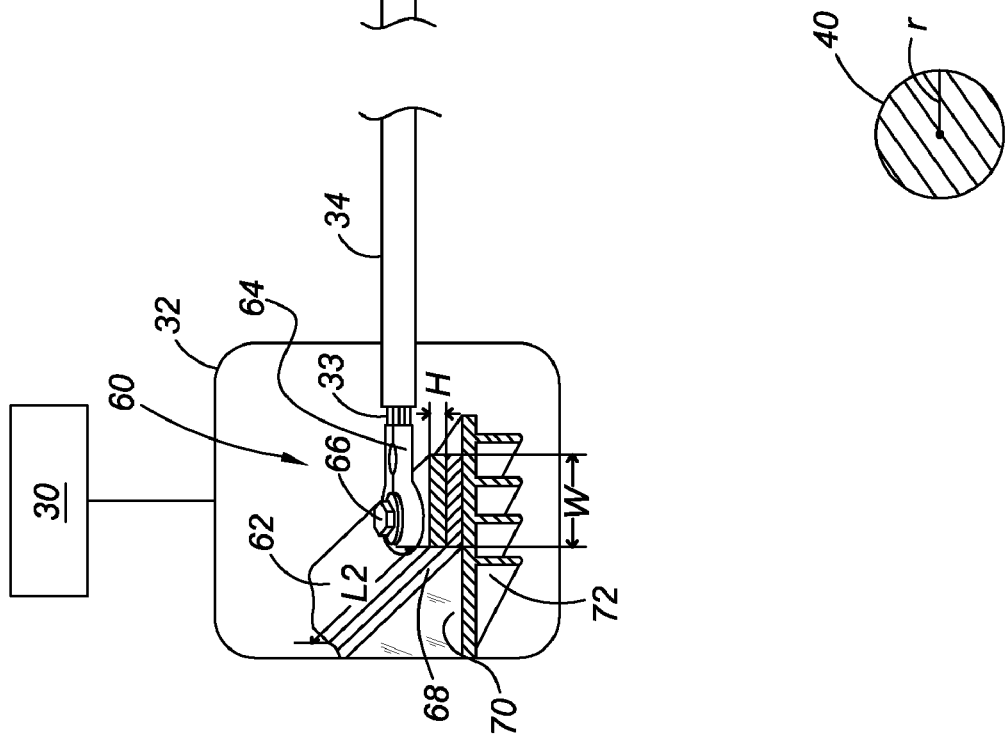
FIG. 1
FIG. 2

ELECTRIC MOTOR POWER CONNECTION ASSEMBLY

TECHNICAL FIELD

The invention relates to an electric power connection assembly with a heat-diverting mechanism for an electric motor.

BACKGROUND OF THE INVENTION

Electric motors, such as those used in a hybrid electromechanical transmission, include a stator powered by electric current fed to stator windings. The stator windings operate at high current densities, and can reach relatively high temperatures of 180 degrees Fahrenheit or more. Electric power for the motor is supplied by a power source, such as a direct voltage battery, and is converted to alternating current by a power inverter. The power is then fed via power cables through terminal connections to motor wires or conductor bars that are connected to the stator windings. The electric current must pass through and be electrically insulated from the transmission casing when traveling from the inverter to the stator windings. The electric current passing through the power cables causes heating within the cables themselves, and the electrical insulation on the outside of the cables impedes the passing of heat from the cables to their operating environment such as under a car or in an engine compartment. The high operating temperature of the stator windings may cause additional heat to pass to the motor wires or conductor bars and even further to the power cables, thus increasing the heat load on the cables, as these electrically-conductive components are also typically good heat conductors. Because power cables have relatively flexible insulation, they typically cannot operate at the high temperatures typical of stator windings, and they must be designed with a larger size (i.e., a larger effective current-carrying cross-sectional area) to keep their operating temperatures within an acceptable working range.

SUMMARY OF THE INVENTION

An electric motor power connection assembly diverts heat from an electrical conductor that carries electric current between a power source and an electric motor. The heat diversion prevents undesirable heating of components, such as power cables that extend from a power inverter to supply current to the stator windings. The electrical conductor is characterized by an effective cross-sectional area perpendicular to the direction of current flow and a length in the direction of current flow that is greater than the radius of a circle having the effective cross-sectional area. The "effective cross-sectional area" is the area perpendicular to the direction of current flow through which current is carried and thus depends on the cross-sectional shape and number of conductive components of the electrical conductor, which could be one or more wires. The electrical conductor is positioned in thermal contact with a heat-diverting mechanism to divert heat from the electrical conductor. The electrical conductor is in thermal contact with the heat-diverting mechanism along a length of the electrical conductor which may be referred to as the "cooled length" and need not be the entire length of the electrical conductor. Preferably, the cooled length is at least three times the radius of a circle with the effective cross-sectional area in order to improve the efficiency of heat diversion.

In one embodiment, the electrical conductor is an extended terminal, such as a ring terminal secured to a power cable, and the heat-diverting mechanism is a cooling fluid applied along the cooled length of the extended terminal. The extended terminal may be secured to a motor terminal (which is secured to the motor wire) by extending a threaded bolt through both the extended terminal and the motor terminal and then securing the bolt to a threaded terminal block. This allows current to flow from the extended terminal to the motor terminal and thereon to the motor wire.

In another embodiment, the electrical conductor is the extended terminal secured to the power cable as described above, but the heat-diverting mechanism is an electrical insulator enclosing the extended terminal along its cooled length to define a cooling passage therebetweeen. The electrical insulator has an opening that is in fluid communication with pressurized fluid that is directed through the opening and through the passage along the cooled length to cool the extended terminal. The electrical insulator may be two semi-cylindrical components configured with radially-inward extending extensions sized so that the insulator contacts the outer periphery of the extended terminal only at the extensions, leaving the cooling passage substantially surrounding the insulator and permitting maximum thermal contact of the pressurized fluid over the periphery.

In another embodiment, the electrical conductor is an exposed portion of the power cable over which the current flows from the power source. For example, a sheath or electrically-insulating protective coating is removed from the power cable along the cooled length, exposing "bare" power cable wires. In this embodiment, the heat-diverting mechanism is a thermally-conductive electrical insulator in thermal contact with the exposed portion (i.e., the bare power cable wires) to draw heat away from the power cable.

In yet another embodiment, the electrical conductor is an electrical bus bar, such as in a power inverter that supplies the power from the power source to the power cable. The heat-diverting mechanism is a thermally-conductive electric insulator in thermal contact with the bus bar. A heat sink may be placed in contact with the thermally-conductive electric insulator to draw the heat away from the insulator.

A hybrid transmission within the scope of the invention includes a transmission casing defining a transmission cavity. A power source, such as a battery, is located outside of the cavity. An electric motor located inside of the cavity powers the transmission in conjunction with another power plant, such as an internal combustion engine, through a transmission gearing arrangement. The electric motor is operatively connected to the power source and is powered by electric current that is fed through an inverter and other components, such as a power cable and a motor wire, to the motor. An electrical conductor and heat-diverting mechanism according to any of the above-described embodiments is used to prevent undesirable heating of the power cable. A power cable with an overall length not greater than 1000 times the radius of a circle with its effective cross-sectional area, and preferably 100 to 300 times the radius, is typical of power cables used in hybrid motor vehicle applications. This length to cross-sectional radius ratio is relatively small in comparison to that of power cable conductors used in other power connection applications, such as underground electric cables. The flexible electrical insulation typically used on the outside of power cables aboard vehicles has a thermal conductivity more than 10,000 times worse than the electrical conductor of the cable, and the thickness of the insulation is more than a tenth of the radius of the conductor. The relatively small ratio of power cable length to effective cross-sectional radius enables successful prevention of unwanted heating of the entire length of the power cable to take place even with heat diversion occurring only at one or both ends of the power cable. Thus, the electric motor power connection assembly described above is suitable for implementation on a hybrid motor vehicle transmission.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration in partial cross-sectional view of a powertrain including a hybrid transmission with an electric motor and an electric motor power connection assembly within the scope of the invention;

FIG. 2 is a schematic illustration in cross-sectional view of an extended ring terminal used in the electric motor power connection assembly of FIG. 1;

DESCRIPTION OF THE PREFERRED EMBODIMENTS

Figure 3:
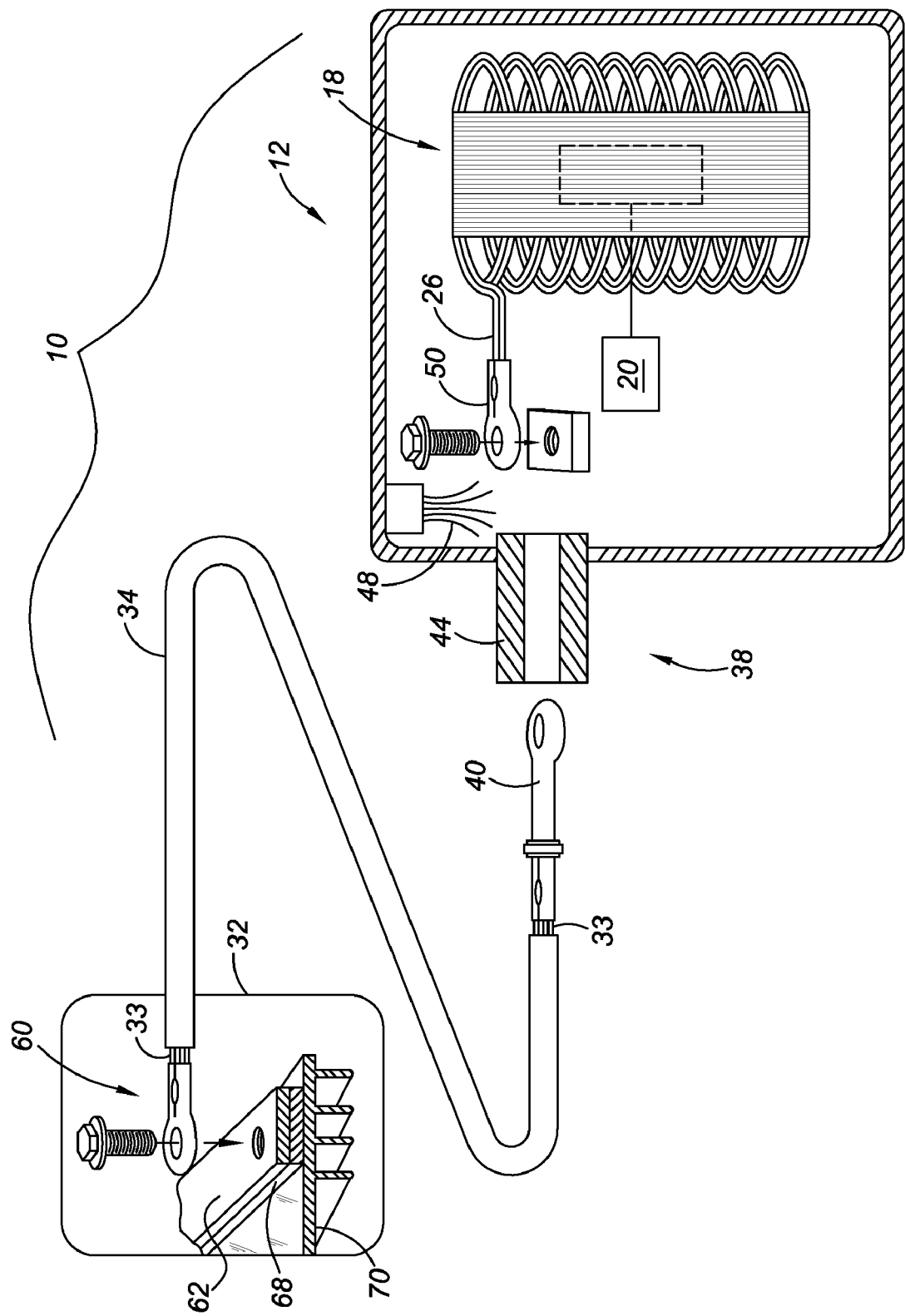
FIG. 3 is a schematic illustration in partially exploded and partial cross-sectional view of the powertrain of FIG. 1.

Referring to the drawings, wherein like reference numbers refer to like components, a portion of a hybrid powertrain 10 for a vehicle is shown. The hybrid powertrain 10 includes a hybrid transmission 12. The transmission 12 includes a transmission casing 14 that defines a transmission cavity 16 in which an electric motor 18 is housed. The electric motor 18 may also be referred to as a motor/generator, as it may be utilized both to provide motive power through a transmission gearing arrangement 20 and to generate electrical energy from rotary power of the transmission gearing arrangement, as is known. Although only one motor 18 is shown for purposes of illustrating the invention described herein, the powertrain 10 may include one or more additional motors. The motor 18 includes a stator 22 having electrical windings 24 that receive electric current through motor wires 26, with each phase of alternating current being provided on a separate motor wire or set of wires. As shown in FIGS. 1 and 3, the motor wires 26 preferably lead into and become integrated with the windings 24. The motor 18 also includes a rotor 28 concentrically surrounded by the stator 22. Electrical power in the stator 22 causes rotary motion of the rotor 28, or vice versa, which affects rotary torque in the transmission gearing arrangement 20. An engine, not shown, is also operatively connected to the transmission gearing arrangement 20 such that either or both the engine and motor 18 can affect speed and torque ratios between an input member (not shown) and an output member (not shown), also operatively connected to the transmission gearing arrangement 20 and extending through the casing 14, as is known to those skilled in the art, to provide tractive motion.

Alternating electric current in the motor wires 26 is provided from or to a power source 30, which is preferably a direct current battery. Power from the direct current battery 30 is converted to alternating current by a power inverter 32. A power cable 33 operatively connects the power inverter 32 with the motor wires 26. Only one power cable 33 is shown for purposes of illustrating the invention; however, a separate power cable is required to provide each separate phase of alternating current to motor windings 24 of different phases. The power cable 33 is shown in fragmented form and has a cable sheath 34 forming a protective, electrically-insulating cover.

The hybrid transmission 12 utilizes multiple electric motor power connection assemblies to manage the heat associated with the relatively high operating temperatures of the stator windings 24, and to minimize and control the effect of such heat on the power cable 33 to minimize the required size of the power cable 33, thus reducing cost and weight. Within the scope of the invention, any one of these electric motor power connection assemblies may be sufficient by itself to meet target heat control objectives of a particular hybrid transmission application, or the various electric motor power connection assemblies may be used in different combinations.

The hybrid transmission 12 utilizes a first electric motor power connection assembly 38 that includes an extended ring terminal 40 crimped on one end of the power cable 33. The extended ring terminal 40 extends through an opening 42 in the casing 14. An electrical insulator 44 also extends through the opening 42 and supports the extended ring terminal 40. The electrical insulator 44 may be a soft rubber material with an upper and a lower portion forming semi-cylindrical openings that mate to support the cable 33 and extended ring terminal 40 shown, as well as additional ring terminals and cables (not shown) adjacent one another at the casing 14 providing current at different phases to the stator windings 26. An O-ring 43 forms a seal between the extended ring terminal 40 and the electrical insulator 44. The extended ring terminal 40 is electrically conductive and has an effective cross-sectional area through which current is carried. In the embodiment of FIG. 1, the extended ring terminal 40 is circular in cross-section, as shown in FIG. 2, and therefore has an effective cross-sectional area of:

$\pi r^2$, where r is the radius of the cross-section.

Within the scope of the invention, the extended ring terminal 40 may have alternative cross-sectional shapes with the same effective cross-sectional areas. With an alternative shape, a radius may be calculated for a circle having the same area as the effective cross-sectional area of the alternative shape. (e.g. an effective cross-sectional area of a square 7 units wide and 7 units high is 49 square units, and a circle with a radius of 4 units has an area of $16\pi$ square units or slightly more than 49 square units, so that the radius of a circle with the same area as the square is slightly less than 4 units.)

The first electric motor power connection assembly 38 also includes a heat-diverting mechanism 48, which in this case is a cooling liquid, applied over a cooled length L1 of the extended ring terminal 40. The cooled length L1 is not necessarily the entire length of the extended ring terminal 40, but must be greater than the radius of a circle with the effective cross-sectional area of the extended ring terminal 40 in order to provide effective cooling. The heat-diverting mechanism 48 (i.e., the cooling liquid) is supplied via a liquid directing device 49 that may be a fluid channel or other fluid containing mechanism, may or may not be pressurized, and may include a spray nozzle.

An electrically conductive motor ring terminal 50 is crimped to the end of motor wires 26. A threaded bolt 52 extends through openings in each of the extended ring terminal 40 and the motor ring terminal 50 to secure the respective terminals in electrical contact with one another. The threaded bolt 52 is in turn secured to a threaded terminal block 54. Current passes between the motor wires 26 and the power cables 33 through the contacting terminals 40, 50. The direction of current flow is along the length L1, perpendicular to the cross-sectional area shown in FIG. 2. Because the motor wires 26, ring terminals 40 and 50 and power cable 33 are all good electrical conductors, they are also generally good heat conductors. The heat diverting mechanism 48 applied to the extended ring terminal 40 minimizes the heat passed from the motor wires 26 to the power cables 33.

A second electric motor power connection assembly 60 is utilized at the opposing end of the power cable 33 to further control and minimize heating of the power cable 33. The second electric motor power connection assembly 60 includes an electrical bus bar 62 which supplies the alternating current converted within the power inverter 32 to one or more devices in need of alternating current, including the power cable 33. (Additional power cables (not shown) that provide current at differing phases to the stator windings 24 are operatively connected to the bus bar 62 in similar fashion.) An electrical connection between the bus bar 62 and the power cable 33 is provided by an electrically-conductive ring terminal 64 crimped to the end of the power cable 33 and secured to the bus bar 62 by a threaded bolt 66 that extends through a threaded opening in the bus bar 62. The electrically-conductive ring terminal 64, as well as all other terminals described herein, may be secured by any known means as an alternative to crimping. A thermally-conductive electrical insulator 68 is in thermal contact with the bus bar 62, running in contact with a bottom surface of the bus bar 62 for at least a length L2, which is referred to as the cooled length. The bus bar 62 and thermally-conductive electrical insulator 68 are actually in thermal contact for a greater length than the cooled length L2 shown, as only a fragment of the total length of the bus bar 62 and thermally-conductive electrical insulator 68 are shown. However, the length L2 is a sufficient cooled length within the scope of the invention, as it is greater than a radius of a circle having the same area as the effective cross-sectional area of the bus bar 62 carrying current. The effective cross-sectional area of the bus bar 62 is the width W times the height H of the bus bar 62. Current runs in the direction of the length L2, perpendicular to the effective cross-sectional area. A heat sink 70 is in thermal contact with the thermally-conductive electrical insulator 68 and pulls heat therefrom. Cooling fins 72 may extend from the heat sink to increase the cooling rate of the bus bar 62. The heat sink 70 is secured to walls or other structure of the power inverter 32. The bolt 66 may also extend through the thermally-conductive electrical insulator 68 and the heat sink 70. Should the temperature of the power cable 33 and ring terminal 64 exceed the temperature of the bus bar 62, heat will flow from the power cable 33 to the bus bar 62 and will be dispersed through the thermally-conductive electrical insulator 68 and the heat sink 70.

FIG. 3 illustrates the powertrain 10 in partially exploded view, showing the second electric motor power connection assembly 60 at one end of the power cable 33 with the bus bar 62 in contact with the electrical insulator 68 and the heat sink 70, all secured to the inverter 32. The power source 30 is not shown. The first electric motor power connection assembly 38 is shown at the other end of the power cable 33, including the extended ring terminal 40 aligned to be inserted through the electrical insulator 44 for operative connection with the motor wires 26 via the motor ring terminal 50 so that the heat diverting mechanism 48 (i.e., cooling liquid) is in thermal contact with the extended ring terminal 40.

Figure 4:
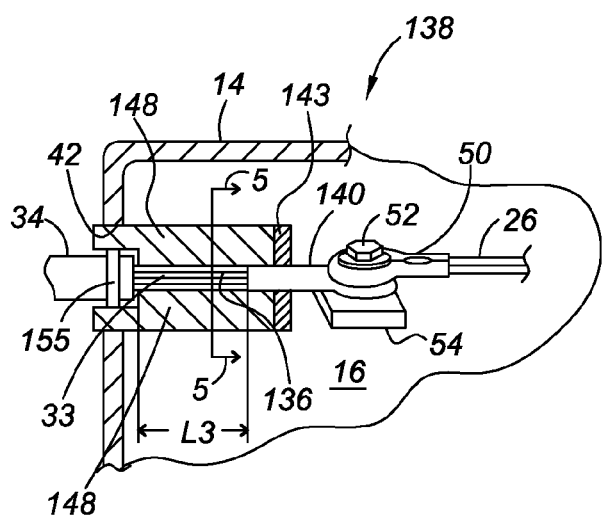
FIG. 4 is a schematic fragmentary illustration in partial cross-sectional view of a first alternate embodiment of an electric motor power connection assembly for use in the powertrain of FIG. 1.
Figure 5:
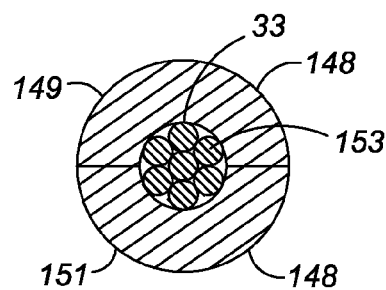
FIG. 5 is a schematic cross-sectional illustration of an electrical insulator and motor wires taken at the arrows 5-5 shown in FIG. 4.

Referring to FIGS. 4 and 5, an alternative embodiment of an electric motor power connection assembly 138 within the scope of the invention is shown. The power cable 33 includes an exposed portion 136 not covered by the cable sheath 34. The exposed portion 136 is in direct contact with a heat-diverting mechanism 148 along a length L3. The heat-diverting mechanism 148 is a thermally-conductive electrical insulator. As is evident in FIG. 5, the thermally-conductive electrical insulator 148 includes a first portion 149 and a second portion 151, each of which is semi-cylindrical in shape and contacts the power cable 33. As seen in FIG. 5, the power cable 33 includes a number of separate power wires 153 bundled together, each having a separate cylindrical shape. The effective cross-sectional area of the power cable 33 is:

$\pi r^2 * n$, where n is the number of separate power wires in the power cable and r is the radius of each wire.

Each power wire 153 is in thermal contact with another power wire and/or with the thermally-conductive electrical insulator 148 to promote heat dissipation through the thermally-conductive electrical insulator 148. The thermally-conductive electrical insulator 148 may be subjected to liquid cooling at the outer surface thereof to further cool the electrical insulator and promote heat flow out of the power cable 33. A sealing O-ring 143 seals a ring terminal 140 crimped on the power cable 33 to prevent liquid within the cavity 16 from being wicked out through the exposed power cable 33. The threaded bolt 52 extends through openings in the motor ring terminal 50 and the ring terminal 140 and is secured to the threaded terminal block 54. Another sealing O-ring 155 surrounds the power cable sheath 34 and seals the sheath 34 with the surrounding thermally-conductive electrical insulator 148 to prevent moisture from entering into contact with the exposed portion 136 from outside of the transmission cavity 16.

Figure 6:
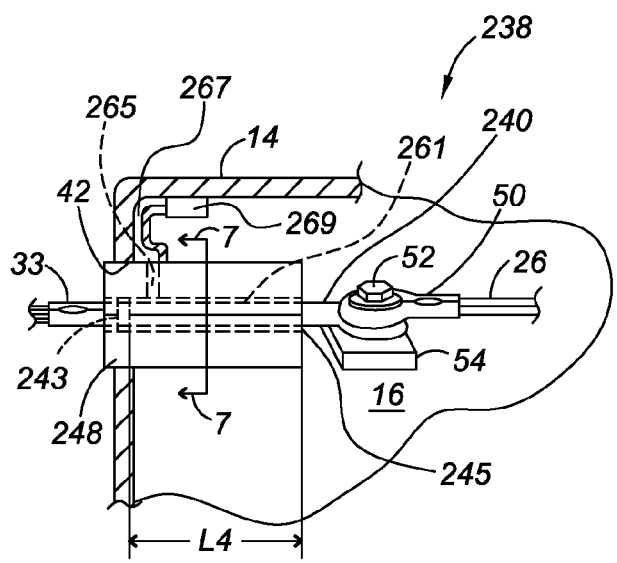
FIG. 6 is a schematic fragmentary illustration in partial cross-sectional view of a second alternative embodiment of an electric motor power connection assembly for use in the powertrain of FIG. 1.
Figure 7:
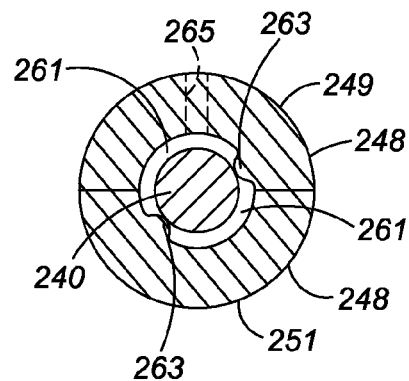
FIG. 7 is a schematic cross-sectional illustration of an extended ring terminal and an electrical insulator forming a cooling passage around the extended ring terminal taken at the arrows 7-7 shown in FIG. 6.

Referring to FIGS. 6 and 7, another embodiment of an electric motor power connection assembly 238 is illustrated. The electric motor power connection assembly 238 includes an extended ring terminal 240 crimped to the end of the power cable 33. An electrical insulator 248 surrounds the extended ring terminal 240, and both are inserted through the opening 42 in the casing 14. As shown in FIG. 7, the electrical insulator 248 includes a semi-cylindrical upper portion 249 and a semi-cylindrical lower portion 251 sized to surround the extended ring terminal to define a cooling passage 261 between an outer surface of the extended ring terminal 240 and the electrical insulator 248. The electrical insulator 248 contacts the extended ring terminal 240 only at small protrusions 263 formed in the electrical insulator 248 so that the cooling passage 261 remains generally annular and exposure of the outer surface of the extended ring terminal 240 is maximized. The protrusions 263 support and center the extended ring terminal 240 and extend only minimally along the length of the extended ring terminal 240. A sealing O-ring 243 is secured around the extended ring terminal 240 to close off and seal one end of the cooling passage 261. The other end 245 of the cooling passage 261 is open to the transmission cavity 16. The electrical insulator 248 has a radially-extending opening 265 extending from the cooling passage 261 to the outer surface of the electrical insulator 248. As shown in FIG. 6, the opening 265 is in fluid communication via a channel 267 that may be formed in the casing 14 (or alternatively by a tube or other means) to a source of pressurized fluid 269, such as a fluid pump, so that fluid may be directed through the opening, into the cooling passage 261 along a length L4 of the extended ring terminal 240 (L4 being defined between the O-ring 243 and the open end 245 of the electrical insulator 248), and out the open end 245. The length L4 is greater than the radius of the generally cylindrical extended ring terminal 240, shown in FIG. 7. The pressurized fluid flowing over the outer surface of the extended ring terminal 240 cools the extended ring terminal 240 to limit heat transfer from the motor wires 26 to the power cable 33.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
a power source;
a motor having a motor wire;
a power cable at least partially outside of the motor and operable to deliver current from the power source to the motor wire;
an electric motor power connection assembly operatively connecting the electric motor with the power cable and configured to allow the electric current to flow from the power cable to the motor wire; wherein the electric motor power connection assembly includes:
an electrical conductor for carrying the electric current through the assembly and characterized by an effective cross-sectional area through which the current is carried and a length in a direction of current flow; wherein the cross-sectional area is perpendicular to the direction of current flow;
a heat-diverting mechanism positioned in thermal contact along the length of the electrical conductor to divert heat from the electrical conductor; and wherein the length is greater than a radius of a circle having said cross-sectional area.

2. The apparatus of claim 1, wherein the electrical conductor is an extended terminal; and wherein the heat-diverting mechanism is a cooling fluid applied along the length of the electrical conductor.

3. The apparatus of claim 2, further comprising:
a motor terminal secured to the motor wire;
a threaded bolt sized to fit through the motor terminal and the extended terminal;
a threaded terminal block in which the bolt is secured; and wherein the bolt secures the extended terminal and the motor terminal to the threaded terminal block and in contact with one another to permit the current to flow therebetween.

4. The apparatus of claim 1, further comprising:
an electrical insulator substantially enclosing the extended terminal along the length to define a passage therebetween; wherein the electrical insulator has an opening; and wherein the heat-diverting mechanism is pressurized fluid directed through the opening and through the passage to cool the extended terminal.

5. The apparatus of claim 1, wherein the electrical conductor is an exposed portion of a power cable through which the current flows from the power source.

6. The apparatus of claim 1, further comprising:
an electrical bus bar for supplying power to the power cable; and a thermally-conductive electrical insulator in thermal contact with the bus bar.

7. The apparatus of claim 1, wherein the length is at least three times greater than the radius.

8. An electric motor power connection assembly for electrically connecting a motor with a power source to permit power flow to the motor, comprising:
an electrically conductive extended terminal for carrying electric current through the assembly and characterized by an effective cross-sectional area through which the current is carried and a length in a direction of current flow; wherein the effective cross-sectional area is perpendicular to the direction of current flow;
a cooling fluid applied over the length of the extended terminal to divert heat from the extended terminal; wherein the length is greater than a radius of a circle having said effective cross-sectional area;
a power cable through which the current flows;
a bus bar in operative electrical contact with the power cable for supplying the current to the power cable;
a thermally-conductive electrical insulator in thermal contact with the bus bar; and
a heat sink in thermal contact with the thermally-conductive electrical insulator.

9. The electric motor power connection assembly of claim 8, further comprising:
a motor wire operatively connected to the motor for providing the current thereto;
a motor terminal secured to the motor wire;
a threaded bolt sized to fit through the motor terminal and the extended terminal;
a threaded terminal block through which the bolt is secured; and wherein the bolt secures the extended terminal, the motor terminal and the threaded terminal block together and in contact with one another to permit the current to flow between the extended terminal and the motor terminal.

10. A hybrid transmission comprising:
a transmission casing defining a transmission cavity;
a power source located outside of the transmission cavity;
an electric motor located in the transmission cavity for powering the transmission; wherein the electric motor is operatively connected to the power source and powered by electric current derived from the power source;
a motor wire operatively connected to the electric motor for providing the electric current thereto;
an electrical conductor operatively connected between the power source and the motor wire for carrying the electric current therebetween and characterized by an effective cross-sectional area through which the current is carried and a length in a direction of current flow; wherein the effective cross-sectional area is perpendicular to the direction of current flow;
a heat-diverting mechanism positioned in thermal contact along the length of the electrical conductor to divert heat from the electrical conductor along the length; and wherein the length is greater than a radius of a circle having said effective cross-sectional area.

11. The hybrid transmission of claim 10, wherein the length is at least three times greater than the radius.

12. The hybrid transmission of claim 10, further comprising:
a power cable carrying the electric current from the power source to the electrical conductor; wherein the electrical conductor is a bus bar for supplying electric current to the power cable; wherein the heat-diverting mechanism is a thermally-conductive electrical insulator in thermal contact with the bus bar; and a heat sink in thermal contact with the thermally-conductive electrical insulator.

13. The hybrid transmission of claim 10, further comprising:
a power cable carrying the electric current between the power source and the motor wire; and wherein the power cable is characterized by an overall length in the direction of current flow and a power cable effective cross-sectional area; and wherein the overall length is not greater than one thousand times a radius of a circle having said power cable effective cross-sectional area.

14. The hybrid transmission of claim 10, further comprising:
a power cable carrying the electric current from the power source to the electric conductor; wherein the electrical conductor is an extended terminal secured to the power cable; and wherein the heat-diverting mechanism is a cooling fluid applied over the length of the electrical conductor.

15. The hybrid transmission of claim 10, further comprising:
a power cable carrying the electric current from the power source to the electric conductor; wherein the electrical conductor is an extended terminal secured to the power cable;
an electrical insulator substantially enclosing the extended terminal along the length to define a passage therebetween; wherein the electrical insulator has an opening; and wherein the heat-diverting mechanism is pressurized fluid directed through the opening and through the passage to cool the extended terminal.

16. The hybrid transmission of claim 10, wherein the electrical conductor is a power cable through which the current flows from the power source; wherein the power cable has an exposed portion; and wherein the length is the exposed portion of the power cable.

* * * * *